United States Patent
Triboulet et al.

[19]

[11] Patent Number: 6,127,434
[45] Date of Patent: Oct. 3, 2000

[54] RECYCLING PROCESS OF A CROSS-LINKED POLYMERIC MATERIAL, IN PARTICULAR FROM ELECTRIC CABLE COATING MATERIALS

[75] Inventors: Carlo Triboulet, Latina, Italy; Madeleine Prigent; Francoise Ducatel, both of Paris, France

[73] Assignee: Alcatel, Paris, France

[21] Appl. No.: 09/121,784

[22] Filed: Jul. 23, 1998

[30] Foreign Application Priority Data

Aug. 12, 1997 [IT] Italy ................................. TO97A0739

[51] Int. Cl.[7] .............................. C08J 11/04; C08J 11/06
[52] U.S. Cl. .................... 521/41; 521/40.5; 521/45.5; 521/46.5; 521/48
[58] Field of Search .......................... 521/41, 40.5, 45.5, 521/46.5, 48; 523/343, 348, 344

[56] References Cited

U.S. PATENT DOCUMENTS

| | | | |
|---|---|---|---|
| 3,891,372 | 6/1975 | Takiura | 425/244 |
| 3,956,541 | 5/1976 | Pringle | 428/2 |
| 4,607,796 | 8/1986 | Enkilopov et al. | 241/3 |
| 4,607,797 | 8/1986 | Enkilopov et al. | 241/23 |
| 4,875,847 | 10/1989 | Wenger et al. | 425/204 |
| 5,026,512 | 6/1991 | Chang | 264/40 |
| 5,704,555 | 1/1998 | Arastoopour | 241/16 |

FOREIGN PATENT DOCUMENTS

| | | |
|---|---|---|
| 0475377 | 3/1992 | European Pat. Off. . |
| 0652251 | 5/1995 | European Pat. Off. . |
| 4102237 | 7/1992 | Germany . |
| 57-000136 | 1/1982 | Japan . |
| 4-197457 | 7/1992 | Japan . |

*Primary Examiner*—Vasu Jagannathan
*Assistant Examiner*—Katarzyna Wyrozebski

[57] ABSTRACT

A process for dereticulating a cross-linked polymeric material, such as cross-linked polyethylene from scraps of electric cable coatings or from unused cable coatings through a mechanical mixing cycle, wherein the cross-linked material is subjected to a specific power per mass unit such as to induce shear stresses in the material itself and temperatures higher than pre-established minimum levels. At the end of this cycle the material goes back to a thermoplastic state that may be substantially regarded as thermoplastic; then, following granulation, cooling, drying and sacking, the material will be ready for re-use, either alone or mixed with virgin polymers, according to usual operating technologies for thermoplastic materials. Eventually, the mechanical mixing cycle may be preceeded by a preliminary crushing cycle of the cross-linked polymeric materials to be treated. Preferably, the mixing cycle is carried out in a twin-screw extruder with special screw and temperature profiles.

16 Claims, 1 Drawing Sheet

RECYCLING PROCESS OF A CROSS-LINKED POLYMERIC MATERIAL, IN PARTICULAR FROM ELECTRIC CABLE COATING MATERIALS

BACKGROUND OF THE INVENTION

1. Technical Field

This invention concerns a process for the recycling of cross-linked polymeric materials, in particular coming from scraps of electric cable coating materials and from unused electric cable coating materials.

2. Discussion of Related Art

The wide use of cross-linked polymers, and in particular cross-linked polyethylenes, for the coating and insulation of electric cables is known; cross-linked, i.e. a three-dimensional cross-link of intermolecular bonds allows, in fact, favourable mechanical properties to be achieved for this application and in particular, it makes such materials substantially infusible (as a result, their hot mechanical collapse is limited and their thermal stability is improved).

It is also known that the processes for coating electric cables with cross-linked polymeric materials, mainly those obtained by extrusion, cause scraps: such scraps just appear as formed by cross-linked materials to a varying cross-linking degree and generally, with different properties and compositions. In fact, the composition and nature of these waste materials besides depending on the type of the basic polymer, also depend on the cross-linking method being used, which determines the cross-linking degree as well as the quantity and kind of residues within the material (specifically, these materials may contain variable quantities of silanic agents, peroxides and various catalysts).

Moreover, in many instances and especially when the cross-linking process is carried out with the help of silanic agents, the cross-linking degree of the scraps from extrusion also depends on the stocking conditions of the scraps themselves, specifically on the presence of water or air humidity.

After all, both the cross-linking degree and composition of cross-linked polymer scraps generated during a manufacturing cycle of electric cables are generally highly variable, save the fact that anyway said materials cannot be regarded as thermoplastic materials.

In fact, cross-linking makes the polymeric materials substantially infusible and, if this may represent an advantage from an applicative standpoint, it does anyway limit recovery and recycling opportunities of such materials: therefore, known recycling processes of polymeric materials are applicable to thermoplastic materials only, which once brought into their melt state, they may be reworked according to common technologies, usually mixed with a virgin polymer of same nature or compatible with it.

At present, however, scraps of cross-linked polymeric materials are not recycled being regarded as non recyclable materials and therefore they are systematically eliminated by burying in dumps or by burning: obviously, such solutions are not satisfactory both from a costing viewpoint—as costs increase considerably with the gradual decrease of dumps availability—and for their impact on the environment. It is obvious that these solutions apply equally to both the cross-linked polymer scraps coming from the manufacturing processes of electric cables coatings and to the coatings themselves made of cross-linked polymeric material, whenever the cables are withdrawn and/or replaced at the end of their service life.

In order to solve the problem of recovering cross-linked polymeric materials, it is customary to carry out a mechanical degradation thereof to reduce them to fine powder utilizable as a filler mixed with virgin polymers.

For instance, patent JP 04-197456 discloses that cross-linked material is heated and submitted to extremely high mechanical shear stresses in a Bambury-type internal mixer: a very fine (0 to 500 $\mu$m) powder is obtained by the end of the process lasting 10 to 60 minutes. A similar process is also disclosed in patent JP 57-136 wherein degradation of cross-linked material to its powder state is carried out in a single-screw extruder or in a cylinder mixer or still in a Brabender-type mixer.

In both processes cited above, the cross-linked polymer is reduced to a powder that, anyway, may not be used directly alone due to its lack of cohesion, but it should be used as an additive to a virgin polymer; additionally, this powder has the drawback of a very low apparent density, hence being very bulky.

SUMMARY OF INVENTION

It is an object of the present invention to provide a process for the recycling of cross-linked polymeric materials which is free from the above inconveniences related to known processes, and which is capable of reducing said materials to their dereticulated state suitable for usual machining technologies for thermoplastic materials.

According to the above defined object, a recycling process is provided for a cross-linked polymeric material, in particular from scraps of electric cable coating materials, characterized in that it comprises a mechanical mixing cycle for said cross-linked polymeric material, during which said cross-linked polymeric material is subjected, for a pre-established time, to a mechanical mixing action and to shear stresses higher than a pre-established value, capable of causing dereticulation of said material.

Specifically, said mechanical mixing cycle is carried out in either a continuous or intermittent mixing equipment, a specific power per mass unit of material comprised between about 0.5 and about 1 kW/h per kg of material being imparted to said material by said mixing equipment.

According to a preferred embodiment of this invention, the mechanical mixing cycle is carried out in a continuous mixing equipment, e.g. a twin-screw extruder-mixer, where the dwelling time of said cross-linked polymeric material inside said continuous mixing equipment is comprised from about 20 to about 60 seconds, during said mechanical mixing cycle said material is subjected to shear stresses of value ranging from about 50 to about 150 $s^{-1}$.

Here and subsequently, as frequently usual in the technological field of polymeric materials, the shear stress imparted to the material is expressed by the shear rate, measured in $s^{-1}$.

Thus, the process according to this invention allows the recycling of cross-linked polymeric materials, e.g. scraps of electric cable coatings or coatings of unused electric cables, without the need of eliminating them through expensive and/or polluting operations: moreover, the recycled material is substantially a homogeneous material having satisfactory mechanical properties that may be converted through the usual machining technologies for thermoplastic materials and re-used in a large number of applications, either alone or mixed with virgin polymers.

Substantially, the Applicant technicians have surprisingly observed that submitting a cross-linked polymeric material to a mechanical mixing action for a sufficient time to induce shear stresses and temperatures higher than pre-established minimum levels in the material itself (i.e. exposing the material to a higher specific power than a pre-established level), the material goes back to a state that can be considered as substantially thermoplastic.

The process may take place in an intermittent internal mixer with operating times ranging from 20 to 30 minutes or, more advantageously from an economic point of view, in continuous operation, e.g. in an extruder-mixer with much shorter times. Dereticulation is obtained, anyway, by subjecting the material to a mechanical mixing action with sufficient levels of stress, temperature and duration: an extruder-mixer appears more convenient only from a costing standpoint if compared with an internal mixer, equally effective in obtaining dereticulation.

Obviously, the equipment in which the process according to the invention is carried out, no matter what type it will be, shall be provided with characteristics capable of subjecting the material to a mechanical action as required for obtaining the dereticulation.

Specifically, if an extruder is used, this should have a geometrical configuration such as to ensure that dwelling time of the cross-linked polymer inside it is enough to cause dereticulation, and both the screw profiles and temperature profile within the extruder shall be optimized to reach sufficiently high temperature and shear stress level.

Specifically, a screw profile with various mixing zones and "counterthreaded" sections returning the material to said mixing zones should be used to have dereticulation taking actually place.

Best results have been obtained with the use of twin-screw extruders: even if extruders with two screws rotating in the same direction were used, the same results can also be obtained with extruders fitted with two screws rotating in opposite directions.

Moreover, even if not strictly required, it is advisable to subject recycling material to a preliminary crushing cycle to improve feeding to the machine where actual mixing takes place, specifically when this is an extruder, as it would be preferable.

At any rate, a polymeric material is obtained at the mixer outlet, which can be reduced to granules, cooled and dried as any other thermoplastic material: thereafter, the dereticulated material can be re-used according to the usual machining technologies for thermoplastic materials, such as moulding or extrusion, either alone or mixed with virgin polymers.

Analysis on cross-linked polymeric materials submitted to the process according to the invention have confirmed both the dereticulation and good mechanical properties of the materials making them particularly suitable for re-used in many applications, for instance as internal sheaths or electric cable fillers.

BRIEF DESCRIPTION OF THE DRAWING

Further characteristics and advantages of the present invention will become apparent from the following description of an embodiment thereof given by way of a non limiting example, with reference to the figures shown in the attached drawing, wherein.

DETAILED DESCRIPTION OF PREFERRED EMBODIMENTS

Figure 1:
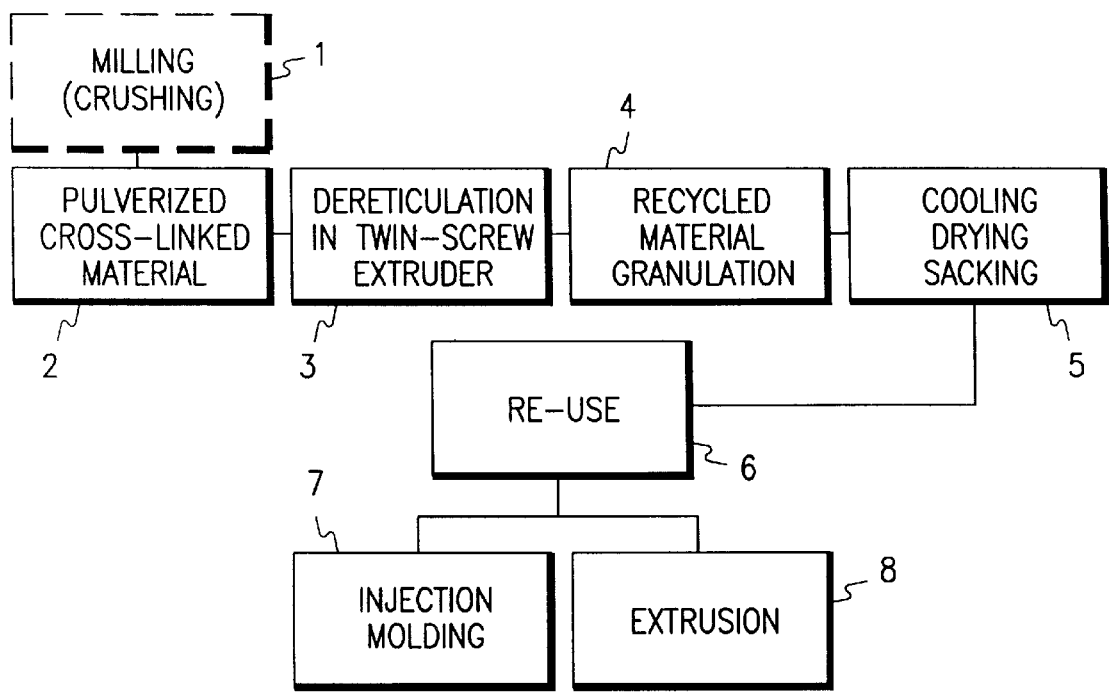
FIG. 1 shows schematically the various steps of the recycling process of cross-linked polymeric materials according to this invention.

With reference to FIG. 1, following a likely preliminary milling or crushing step 1 of the cross-linked polymeric materials to be treated, substantially known as such, the process according to this invention comprises a mechanical mixing cycle 3, where a specific power per mass unit is imparted to the pulverized cross-linked polymeric material, such to cause shear stresses and temperatures higher than pre-established minimum levels in the material, which are enough to determine dereticulation of the material and cause it to go back to a state that can be substantially regarded as thermoplastic.

The preliminary crushing step 1 is not strictly required to obtain the dereticulation result provided by this invention, but it has the function of improving material feeding to the equipment (mixer) wherein mixing cycle 3 is taking place.

Mixing cycle 3—which lasts long enough to let material dereticulation occur—is followed by a granulating step 4 for the dereticulated material, which is substantially known as such: thereafter, the material can be cooled, dried and sacked (step 5 of FIG. 1) and therefore is ready for re-use 6, either alone or mixed with virgin polymers, according to usual machining technologies for thermoplastic materials. Specifically, the recycled material according to this invention is suitable for re-use either as moulding material, for instance for the manufacture of technical items (Step 7 of FIG. 1) or as extrusion material, for instance to obtain sheaths and fillers for electric cables (Step 8).

Figure 2:
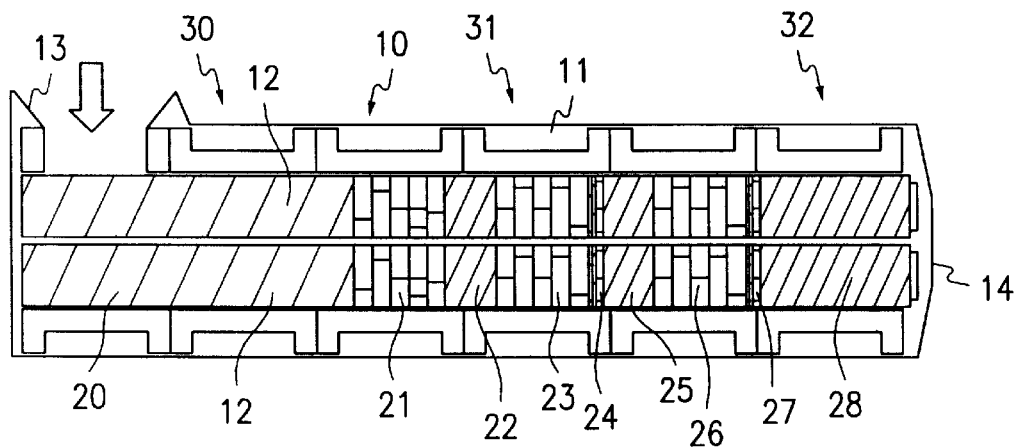
FIG. 2 shows schematically a partial view of an extruder-mixer through which a step of the process according to this invention can be executed.

With reference to FIG. 2, an extruder-mixer indicated by 10, known as a whole, and represented just schematically for the sake of simplicity, can be favourably used to execute the mechanical mixing cycle 3 of the process according to the invention. The extruder 10 comprises a cylinder 11, containing inside at least a rotary screw 12, and is provided with a feed hopper 13 and an extrusion head 14 located on the opposite cylinder ends 11, respectively.

As previously mentioned, the extruder 10 comprises preferably two flanked or overlapped screws (12), rotating in the same direction or in opposite directions, however with the same profile: specifically, the screw/(s) profile 12 as well as the temperature profile inside the cylinder 11 is optimized to obtain temperature and shear stresses on the material that are sufficiently high to cause material dereticulation.

To this end, the screw 12 has a plurality of mixing zones (or blocks) and conveying zones spaced by "counter-threaded" sections returning the material to the mixing zones. According to a preferred embodiment illustrated in FIG. 2, for instance, starting from one screw end in line with the feeding hopper 13, the screw 12 sequentially comprises a first conveying block 20, a first mixing block 21, a second conveying 22 and a second mixing block 23; the second mixing block 23 is followed in the following order by a first "counter-threaded" block 24, a third conveying block 25, a third mixing block 26 and a second "counter-threaded" block 27; finally, before the head 14 of the extruder 10 the screw 12 comprises a fourth last conveying block 28.

Preferably, the screw 12 and the head 14 of the extruder 10 are maintained at their pre-established temperatures, respectively, for instance about 70° C. or in a range of about 50° C.–80° C. for the screw 12 and about 230° C. or in a range of about 200°–240° C. for the head 14, whereas the cylinder 11 is heated to have an increasing temperature profile from a feeding zone 30 in line with the hopper 13 and maintained at a relatively low temperature e.g., 50°–100° C. towards the extrusion head 14; specifically, downstream of the feed zone 30 the cylinder 11 may have a central zone 31 at 110°–210° C. and an end zone 32 at 180°–240° C. at the head 14; the end zone 32 is maintained at high temperature, near or equal to the temperature of the head 14 which is at between 200°–240° C., whereas the central zone 31 is maintained at an intermediate temperature between the temperatures of the feed zone 30 and end zone 31.

The present invention is now further described by way of the following non limiting examples.

EXAMPLE 1

Cross-linked polyethylene scraps from the coating process of electric cables were subjected to a recycling procedure according to the invention.

In particular, two different types of polyethylene were used, one cross-linked with peroxides and the other with silanic agents, respectively.

The waste materials were first milled to a pulverized material consisting of small particles having an average size less than 4 mm. Pulverized materials were then introduced into a twin-screw extruder having a special screw profile as previously described with reference to FIG. 2 of the attached drawing.

Specifically, two extruders with a different configuration were used, one for laboratory tests and the other for industrial production: both the process parameters and machine characteristics for both configurations are summarized in Table 1 where the symbols ÷ indicates a range between the two values and where a comma indicates a decimal point.

TABLE 1

| Process conditions and parameters for twin-screw extruder | Laboratory tests configuration | Industrial tests configuration |
| --- | --- | --- |
| Extruder diameter (mm) | 21 | 82 |
| Extruder length in diameters | 48 | 32 |
| Screw geometry - block length (mm) | | |
| 1st conveying block | 400 ÷ 600 | 800 ÷ 1000 |
| 1st mixing block | 100 | 250 |
| 2nd conveying block | 100 | 100 |
| 2nd mixing block | 100 | 250 |
| 1st counter-threaded block | 12.5 | 50 |
| 3rd conveying block | 100 | 100 |
| 3rd mixing block | 100 | 250 |
| 2nd counter-threaded block | 12.5 | 50 |
| 4th conveying block | 275 ÷ 375 | 550 ÷ 800 |
| Thread depth (mm) | 4 | 15.5 |
| Screw temperature (° C.) | 70 | 70 |
| Cylinder Temperature Profile (° C.) | | |
| Feed zone | 100 | 60 |
| Central zone | 120 ÷ 150 | 180 ÷ 200 |
| End zones | 200 ÷ 230 | 200 ÷ 230 |
| Head | 230 | 230 |
| Screw rotation (rpm) | 400 ÷ 600 | 250 ÷ 500 |
| Hourly flow rate (kg/h) | 4 ÷ 6 | 100 ÷ 250 |
| Absorbed power (kW/h) | 4 ÷ 6 | 80 ÷ 150 |

In both instances, the material obtained was tested to determine its cross-link degree, specifically expressed by the percentage contents of gel and its solubility in toluene.

The results obtained for the materials treated according to the laboratory test configuration are given in Table 2; the materials treated under industrial process configuration have given similar values (not shown in detail).

TABLE 2

| Material | Gel contents % | Dispersion on 100 μm film |
| --- | --- | --- |
| Cross-linked polyethylene with peroxide before treatment | 91 | — |
| Cross-linked polyethylene with peroxide after treatment | 20 ÷ 30 | good |
| Cross-linked polyethylene with silanic agents before treatment | 83 | — |
| Cross-linked polyethylene with silanic agents after treatment | 25 | good |

Experimental results indicate that the process according to this invention has led to a satisfactory dereticulation of the material under test: as a matter of fact, as known, cross-linked materials appear to be substantially insoluble in toluene and have a gel content comprised between 80% and 92%, whereas non cross-linked materials have a gel content practically null. Thus, the materials treated according to the invention indicate a significant dereticulation.

Evaluation of the thermoplastic state of recycled materials was also made by measuring the thermofluidity index at 120° C. with a weight of 21.60 kg, expressed in extruded grams within 10 minutes. The results are given in Table 3. The change of the thermofluidity index depends on the nature of starting polymers; anyway, according to the values observed, the materials treated according to the invention can be considered as substantially thermoplastics.

TABLE 3

| Material | Thermofluidity Index at 120° C. (extr. g in 10 min) |
| --- | --- |
| Cross-linked polyethylene with peroxide before treatment | 0 |
| Cross-linked polyethylene with peroxide after treatment | 0.50 ÷ 4 |
| Cross-linked polyethylene with silanic agents before treatment | 0 |
| Cross-linked polyethylene with silanic agents after treatment | 0.50 ÷ 9 |

Finally, some mechanical properties of recycled materials according to the invention were evaluated using some samples obtained from compression moulded plates at 170° C. The relevant results are given in Table 4 and prove the excellent aggregation state of the material.

TABLE 4

| Material | Ultimate Tensile Strength (MPa) | Ultimate Elongation % |
| --- | --- | --- |
| Recycled material from polyethylenic insulating materials cross-linked with peroxide | 9 ÷ 12 | 100 ÷ 200 |
| Recycled material from polyethylenic insulating materials cross-linked with silanic agents | 10 ÷ 12 | 100 ÷ 150 |

Tests were carried out using cross-linked polyethylene with peroxide or silanic agents; however, in addition to other polyethylene cross-link processes an equivalent treatment may also be applied to cross-linked ethylene copolymers, cross-linked vinyl-acetate-ethylene copolymers and alchyl-acrilate-ethylene copolymers.

Excellent results were also obtained through direct treatment of polymeric material scraps consisting of mixtures of various polymers originating from electric cable coatings: for instance, in the case of medium and high voltage insulating layers formed by a real insulation layer of cross-linked polyethylene and further semi-conductor layers of cross-linked alchyl-acrilate-ethylene copolymers, both materials were treated simultaneously and dereticulation comparable with that of the cross-linked polyethylene alone was finally obtained.

EXAMPLE 2

Cross-linked polymeric materials treated as described in the above example 1 were used in some industrial applications to evaluate their real capability of use. Specifically, these materials were directly used to manufacture internal "padding" sheaths of the type usually provided under armored wires and bands in electric cables.

Moreover, these materials were used as polymeric components of filler mixtures, as provided to "fill" the voids between insulated cores and the external sheath of electric cables, in partial or total replacement of virgin polymers usually adopted for this kind of applications.

Mixture formulations listed under Table 5 were used (shown compositions are expressed in parts per weight for 100 parts of polymer).

TABLE 5

| Component | A | B | C | D |
|---|---|---|---|---|
| Elastomeric polymers | 100 | 50 | 50 | 25 |
| Thermoplastic polymers | — | — | 50 | 25 |
| Recycled polymers | — | 50 | — | 25 |
| Mineral filler | 500 ÷ 15000 | 500 ÷ 1500 | 500 ÷ 1500 | 500 ÷ 1500 |
| Plasticizing oils | 20 ÷ 100 | 20 ÷ 100 | 20 ÷ 100 | 20 ÷ 100 |
| Process agents | 5 ÷ 50 | 5 ÷ 50 | 5 ÷ 50 | 5 ÷ 50 |

Elastomeric polymers stand for e.g. EPDM rubbers, EVA rubbers (VA ranging from 28 to 80%), butyl rubbers, etc.

Thermoplastic polythenes mainly stand for polyethylene, polyethylene copolymers with butene, hexene, octane, butyl-acrylates, ethylacrylates, etc.

Mineral fillers stand for e.g. calcium carbonate, calcium and magnesium carbonates, aluminium hydrate, magnesium hydroxide, talcs, kaolin.

Plasticizing oils stand for e.g. natural and synthetic oils of aromatic or naphthenatic nature, phthalic esters of octylenic, nonyleni-, decylenic, undecylenic-alcohol, and phosphorous esters.

Process agents stand for solid paraffins, stearic acid and its salts.

Finally, cross-linked polymeric materials treated as described in the previous example 1 were also used as moulding materials.

Specifically, consideration was given to a material originated from scraps based on a cross-linked polyethylene mixture with peroxide along with cross-linked polyethylenes with silanic agents, in equal parts. Both the materials were injection moulded as "handlebar" test tubes, which were then submitted to usual tests for determining their mechanical properties.

An ultimate tensile strength of about 20 Mpa and an ultimate elongation of about 60% were observed on both materials.

Both the materials have shown an excellent moulded surface.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A process for the recycling of a cross-linked thermoplastic polythenes polymeric material coming from machining scraps of electric cable coating materials, characterized in that it comprises a mechanical mixing cycle of said cross-linked thermoplastic polythenes polymeric material carried out in an extruder-mixer having a feed zone, at least one mixing zone and an extrusion head, during which said cross-linked thermoplastic polythenes polymeric material is submitted for a pre-established time to a mechanical mixing action and to shear stresses higher than a pre-established value in the range of 50 to 150 $S^{-1}$, and wherein the extruder-mixer is heated so as to have an increasing temperature profile from its feed zone to its extrusion head, such as to cause dereticulation of said material.

2. A process according to claim 1, characterized in that during said mechanical mixing cycle said material is subjected to a specific power per mass unit of material ranging from 0.5 to 1 kW/h per kg of material, by said mixing equipment.

3. A process according to claim 1, characterized in that said mechanical mixing cycle is carried out in a continuous mixing equipment, that the dwelling time of said cross-linked thermoplastic polythenes polymeric material inside said continuous mixing equipment ranges from 20 to 60 seconds.

4. A process according to claim 1, characterized in that said extruder-mixer is a twin-screw type extruder-mixer having two overlapping screws.

5. A process according to claim 4, characterized in that said twin-screw extruder-mixer further includes a central zone located downstream from said feed zone and an end zone located downstream from the central zone, wherein the feed zone is maintained at a temperature ranging from 50° C. to 100° C.; wherein the end zone is maintained at a temperature ranging from 110° C. to 210° C.; wherein the central zone is maintained at a temperature ranging from 180° C. to 240° C.; wherein the extrusion head of said extruder-mixer is maintained at a temperature ranging from 200° C. to 240° C.; and wherein the screws of said extruder-mixer are maintained at a temperature ranging from 50° C. to 80° C.

6. A process according to claim 4, characterized in that the two screws have a plurality of threaded blocks having threads with differing pitch and thread angle; wherein at least one of said threaded blocks is provided with a thread arranged in an opposite direction compared to the threads of the other threaded blocks.

7. A process according to claim 1, characterized in that, before said mechanical mixing cycle, it further comprises a mechanical crushing step of said cross-linked thermoplastic polythenes polymeric materials to obtain a pulverized material.

8. A material obtained by recycling cross-linked polymeric materials, characterized in that it is obtained through a recycling process according to claim 1.

9. A material obtained from cross-linked polymeric materials submitted to the recycling process according to claim 1, characterized in that it has a percentage gel contents below 30%.

10. A process according to claim 4, characterized in that during said mechanical mixing cycle said material is subjected to a specific power per mass unit of material ranging from 0.5 to 1 kW/h per kg of material, by said mixing equipment.

11. A process for recycling cross-linked thermoplastic polythenes polymeric material coming from machining scraps of electric cable coating materials, the process comprising the steps of:

providing an extruder having at least one screw surrounded by a cylinder, wherein the extruder further includes a feed zone, a central zone downstream from the feed zone, an end zone down stream from the central zone and an extruder head downstream from the end one;

heating the cylinder of the extruder so that the feed zone, the central zone and the end zone and the extruder head have an increasing temperature profile; and submitting the cross-linked thermoplastic polythenes polymeric material to a mechanical mixing action sufficient to cause dereticulation of said material by subjecting the material to shear stresses in the extruder in the pre-established range of 50 to 150 $S^{-1}$.

12. The process according to claim 11, wherein the extruder subjects the material to a power per mass unit of material in the range of 0.5 to 1 kW/h per kg of material.

13. The process according to claim 11, wherein the feed zone is maintained at a temperature ranging from about 50° C. to 100° C., wherein the central zone is maintained at a temperature ranging from about 110° C. to 210° C., wherein the end zone is maintained at a temperature ranging from about 180° C. to 240° C., wherein the extruder head is maintained at a temperature ranging from about 200° C. to 240° C., and wherein the at least one screw is maintained at a temperature ranging from about 50° C. to 80° C.

14. The process according to claim 11, wherein the extruder has two overlapping screws.

15. The process according to claim 14, wherein the two screws have a plurality of threaded blocks having threads with differing pitch and thread angle, wherein at least one of said threaded blocks is provided with a thread arranged in an opposite direction compared to the threads of the other threaded blocks.

16. The process according to claim 11, wherein the material is subjected to the shear stresses for 20 to 60 seconds.

* * * * *

UNITED STATES PATENT AND TRADEMARK OFFICE
CERTIFICATE OF CORRECTION

PATENT NO. : 6,127,434
DATED : October 3, 2000
INVENTOR(S) : Triboulet et al.

It is certified that error appears in the above-identified patent and that said Letters Patent is hereby corrected as shown below:

Column 8,
Line 66, after "claim", please cancel "4" and substitute -- 5 -- therefor.

Column 9,
Line 13, please cancel "one" and substitute -- zone -- therefor.

Signed and Sealed this

Sixth Day of November, 2001

Attest:

*Nicholas P. Godici*

NICHOLAS P. GODICI
*Attesting Officer*   *Acting Director of the United States Patent and Trademark Office*